United States Patent [19]
Needle et al.

[11] Patent Number: 5,235,677
[45] Date of Patent: Aug. 10, 1993

[54] RASTER GRAPHICS COLOR PALETTE ARCHITECTURE FOR MULTIPLE DISPLAY OBJECTS

[75] Inventors: David L. Needle, Alameda; Robert J. Mical, Foster City, both of Calif.

[73] Assignee: Atari Corporation, Sunnyvale, Calif.

[21] Appl. No.: 360,338

[22] Filed: Jun. 2, 1989

[51] Int. Cl.$^5$ ............................................. G06F 15/62
[52] U.S. Cl. .................... 395/131; 340/703
[58] Field of Search ............ 364/518, 521; 340/701, 340/703; 395/131, 164

[56] References Cited

U.S. PATENT DOCUMENTS

| | | | |
|---|---|---|---|
| 4,149,184 | 4/1979 | Giddings et al. | 340/703 X |
| 4,243,984 | 1/1981 | Ackley et al. | 340/703 |
| 4,521,770 | 6/1985 | Rhyne | 340/703 |
| 4,674,051 | 6/1987 | Fisher | 364/443 |
| 4,827,249 | 5/1989 | Chauvel et al. | 340/703 |
| 4,847,604 | 7/1989 | Doyle | 340/703 X |
| 4,857,901 | 8/1989 | Lathrop | 340/703 |
| 4,918,436 | 4/1990 | Johary | 340/703 X |
| 4,982,342 | 1/1991 | Moribe et al. | 364/518 |
| 5,091,717 | 2/1992 | Carrie et al. | 340/703 |
| 5,091,720 | 2/1992 | Wood | 395/131 X |

Primary Examiner—Mark K. Zimmerman
Attorney, Agent, or Firm—Michael L. Sherrard

[57] ABSTRACT

A raster graphics color palette architecture for multiple display objects or sprites includes a first memory for storing pen index information for each display object. The pen index information for each display object includes pen index information corresponding to each pixel of that display object. A second memory stores indexing information for each display object. The indexing information maps the pen index information for the corresponding display object to pen numbers. A pen palette device includes a number of dynamically alterable registers, or "pens," containing RGB information for driving a multicolor raster display. In operation, pen index information representing the pixels of a display object is accessed from the first memory. This pen index information is mapped into pen numbers using the indexing information for the display object stored in the second memory. These pen numbers are then coupled to the pen palette to provide the RGB information for driving a multicolor raster display. Indexing information in the second memory associated with a particular sprite can thus be changed without changing the pens in the pen palette allowing changes to the colors of an individual display object sprite without affecting the colors of other display object.

6 Claims, 5 Drawing Sheets

| FORMAT | FLAG | OFFSET | UNIT OF PEN INDEX INFO. |
|--------|------|--------|-------------------------|
| PACKED | 0 | 1001 | 10 |
| LITERAL | 1 | 1001 | 1010101010101010 |

FIG.-6

| |
|---|
| UNIT SIZE PEN INDEX NO. |
| PEN NUMBERS |
| BIT FILL INFO. |
| LOCATION IN SYST. MEM. OF PIXEL DATA BLOCK |

FIG.-5

| |
|---|
| OFFSET ONE |
| DATA ONE |
| OFFSET TWO |
| DATA TWO |
| OFFSET THREE |
| DATA THREE |
| DONE |

RASTER GRAPHICS COLOR PALETTE ARCHITECTURE FOR MULTIPLE DISPLAY OBJECTS

BACKGROUND OF THE INVENTION

1. Field of the Invention

The invention relates generally to multicolor visual images including multiple dynamically interactive sprites, and more particularly to an apparatus and method for producing such images.

2. Description of the Related Art

The use of dynamically interactive sprites in multicolor visual images is well known. A sprite typically appears as a distinct object within a visual image. Often, a sprite has attributes associated with it which determine how that sprite interacts with other sprites in an image.

Figure 1:
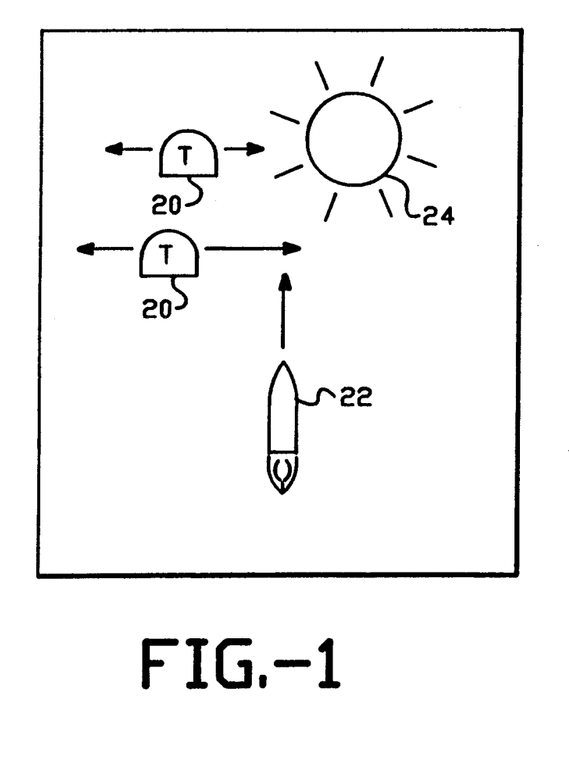
FIG. 1 shows an exemplary image including multiple dynamically interactive sprites.

For example, referring to the illustrative drawing of FIG. 1, there is shown an exemplary multicolor image including four sprites: two targets 20, a rocket 22 and a sun 24. The sprites, for example, can be used in the context of a game. In one illustrative type of game, for example, the targets 20 move horizontally across the screen, either to the right or to the left as indicated by the horizontal arrows. The rocket 22 moves vertically across the screen in an upward direction as indicated by the vertical arrow. A user, for example, fires the rocket by activating hand operated controls (not shown). The objective of the illustrative game is to cause the image of the rocket to collide with the image of the target.

In the exemplary image, both the targets 20 and the rocket 22 possess an attribute known as collidability. When they collide, the result is an alteration in the behavior or appearance of one or both of them. For example, one possible alternative result may be that the target and the rocket both disappear from view; another possible alternative result may be that the target and the rocket both are transformed into an image of an explosion.

In contrast, the sun 24 does not possess the attribute of collidability. Both the rocket 22 or the target 20s can traverse the image of the sun 24 without altering any of their behaviors. For example, as the targets 20 traverse the image of the sun, the targets are visible in front of the sun. Similarly, as the rocket 22 traverses the image of the sun, the rocket is visible in front of the sun.

Figure 2:
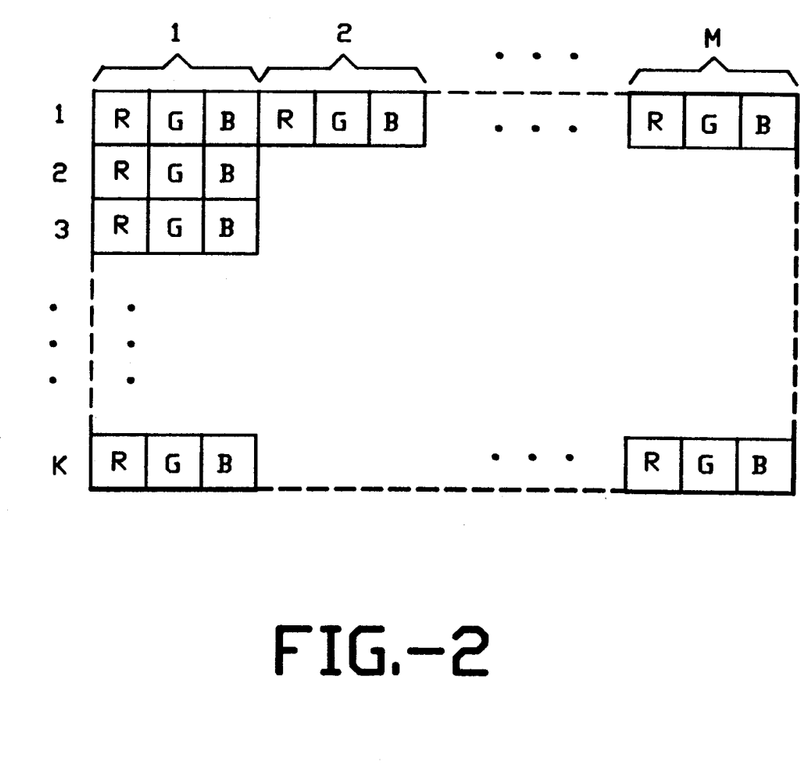
FIG. 2 shows an exemplary display screen suited for displaying the image of FIG. 1 and including an M by K array of RGB pixels.

Images that include dynamically interactive sprites generally have been produced using a display screen including a multiplicity of pixels. The illustrative drawing of FIG. 2 represents a display screen including an array of pixels arranged in a M by K grid. Each of the pixels includes red, green and blue (RGB) color producing elements. The color of each respective pixel is determined by the relative intensities of the red, green and blue colors emanating from its corresponding color producing elements. An image is produced by individually controlling the respective color emanating from each pixel of the display.

Figure 3:
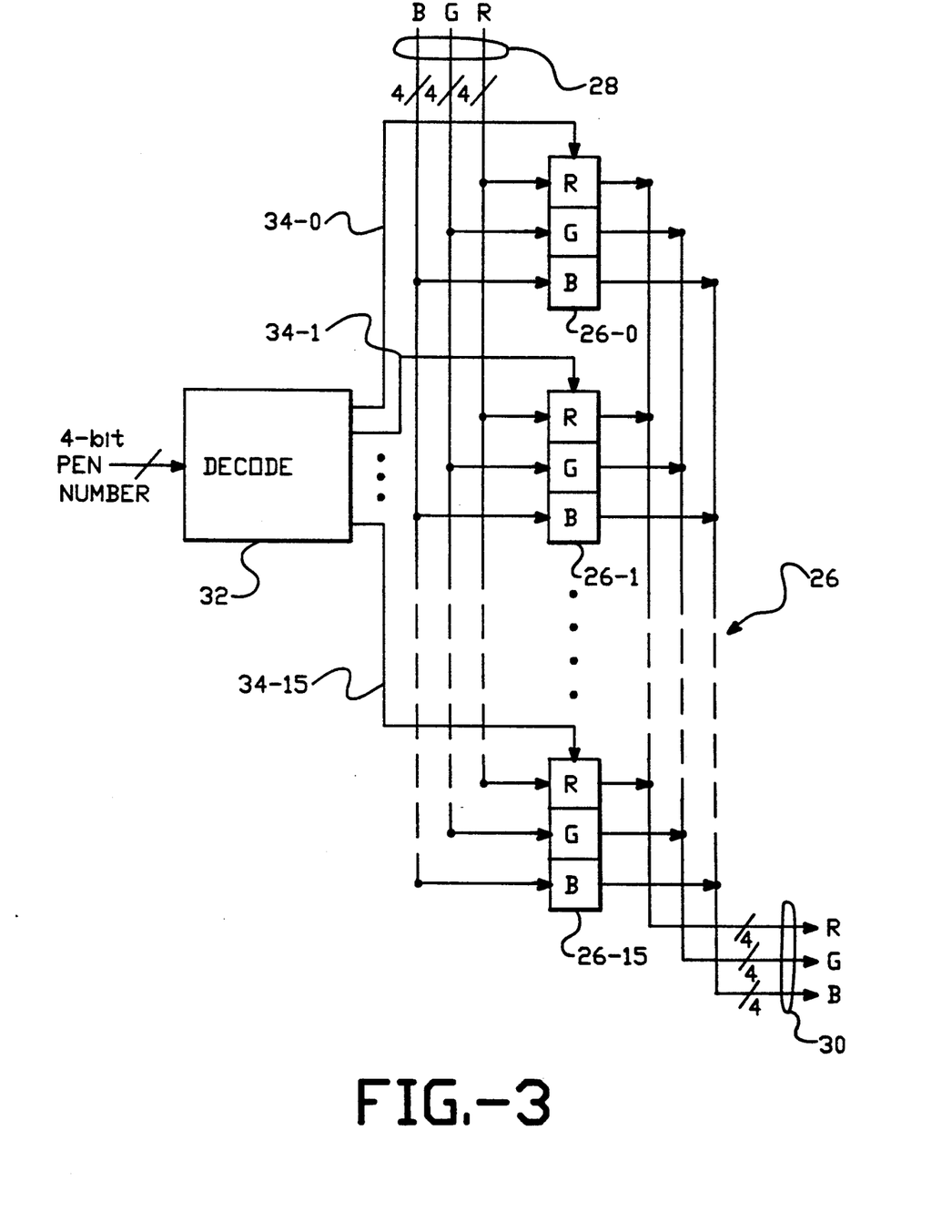
FIG. 3 is an exemplary block diagram of a pen palette device.

One well known system for individually controlling the respective RGB color intensities of a multiplicity of pixels involves the use of an electronic device known as a pen palette. The illustrative drawings of FIG. 3 show an exemplary pen palette 26. The pen palette 26 includes sixteen pens labeled 26-0 through 26-15. Each respective pen comprises a 12-bit storage device that stores four bits of red color information, four bits of green color information and four bits of blue color information. Since there are sixteen pens, sixteen different 12-bit units of RGB information can be stored by the pen palette 26. It will be appreciated that the respective units of RGB information stored in the individual pens ordinarily can be changed in a manner well known to those skilled in the art by providing new units of RGB information on lines 28.

In operation, an image is generated pixel by pixel by selecting a four bit pen number for each respective pixel and providing on lines 30 the respective unit of RGB information stored by the pen corresponding to the selected pen number. For example, for each pixel a four bit pen number is provided to decode logic 32. In response to each pen number, the decode logic 32 provides a control signal on the appropriate one of control lines 34-0 through 34-15 which causes a corresponding pen to provide a respective 12-bit unit of RGB information on lines 30. The units of RGB information provided on lines 30 determine the color that emanates from each pixel of the array.

The production of an image that includes dynamically interactive sprites ordinarily involves the storage of a significant number of bits of digital information. For example, for substantially each pixel of each sprite, information typically is stored to identify the pen number that points to the pen that stores the unit of RGB information that controls the color of that pixel.

While earlier systems and associated methods for producing images that include dynamically interactive sprites generally have been successful, there have been shortcomings with their use. For example, sixteen different binary four bit combinations are required to specify all sixteen of the pen numbers of the exemplary sixteen pen palette 26. However, the use of fewer bits to identify pen numbers frequently can be desirable because it can reduce the number of bits stored to produce an image. Unfortunately, in the past the use of fewer bits to identify pen numbers often has not been satisfactory.

Another problem with earlier systems and methods was the difficulty in alternating the colors emanating from individual pixels of a particular sprite between a first color and a second color, for example, without affecting the appearance of other sprites illuminated with either the first or the second color. For example, in the illustrative image of FIG. 1, it can be desirable to show the flame at the base of rocket 22 to flicker by alternating the colors emanating from individual pixels of the flame between orange and red. At the same time, it can be undesirable to similarly alter the orange color emanating from pixels used to portray the sun 24.

Thus, there has been a need for an apparatus and method for producing multicolor visual images including dynamically interactive sprites in which information identifying pen numbers for each sprite can be stored with fewer bits. Furthermore, there is a need for such a method and apparatus in which the colors emanating from respective individual pixels of sprites can be individually changed without affecting the appearance of other sprites. The present invention meets these needs.

SUMMARY OF THE INVENTION

The invention provides an apparatus for producing multicolor images that include multiple dynamically interactive sprites. An electronic pen palette device produces a unit of RGB information for substantially each pixel of each sprite in the image. The pen palette includes a plurality of pens each of which stores a unit of RGB information. Each pen is identified by a pen number. A first storage device stores binary units of pen index information for each sprite appearing in the image, such that for each sprite the first storage device stores at least one binary unit of pen index information for substantially each pixel of the sprite. A second storage device stores indexing information for each sprite, such that for each sprite indexing information is stored which relates the binary units of pen index information stored by the first storage device to a pen number. An indexing device responsive to the binary units of pen index information and the indexing information identifies a pen number for substantially each pixel of each sprite.

The invention also provides a method for producing a multicolor image including multiple dynamically interactive sprites. The method involves the use of an electronic pen palette device which produces a unit of RGB information for substantially each pixel of each sprite in the image. The pen palette device includes a plurality of pens, each of which stores a unit of RGB information. Each pen is identified by a pen number. The method includes the step of storing at least one unit of pen index information for substantially each pixel of each sprite that appears in the image. Indexing information also is stored for each sprite. The indexing information relates each unit of pen index information stored for the sprite to a pen number. The indexing information is used to relate each unit of pen index information to a pen number.

These and other features and advantages of the present invention will become more apparent from the following description of an exemplary embodiment thereof, as illustrated on the accompanying drawings.

BRIEF DESCRIPTION OF THE DRAWINGS

The purpose and advantages of the present invention will be apparent to those skilled in the art from the following detailed description in conjunction with the appended drawings in which.

DETAILED DESCRIPTION OF THE PREFERRED EMBODIMENT

The present invention comprises a novel apparatus and related method for producing multicolor images that include multiple dynamically interactive sprites. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 4:
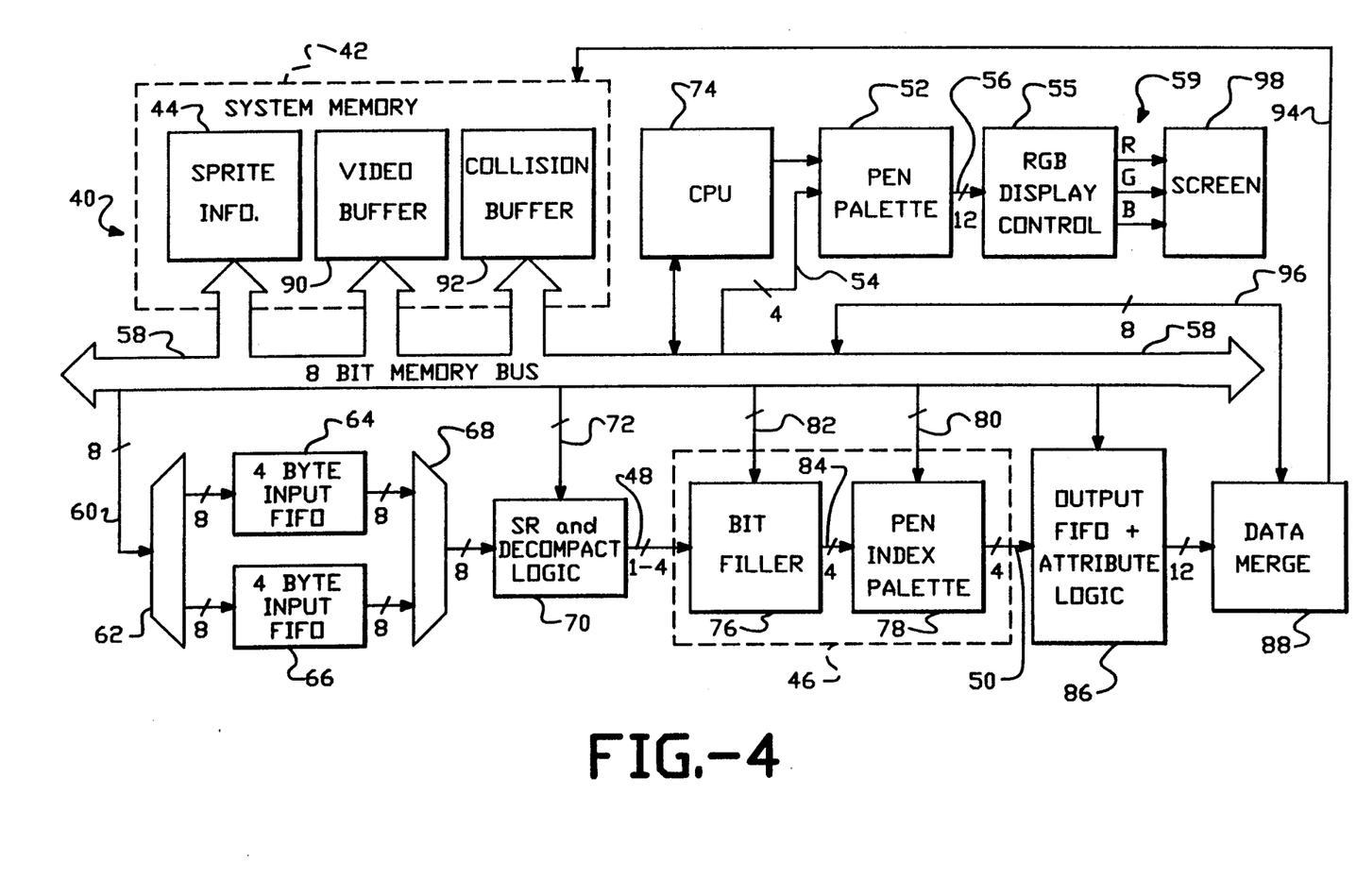
FIG. 4 is a block diagram of an apparatus in accordance with the invention.

FIG. 4 shows an illustrative block diagram of an apparatus 40 in accordance with the present invention. The apparatus 40 includes system memory 42 which can store sprite information for multiple respective sprites in a sprite information block 44. The sprite information is used to control the production of sprites in a visual image produced on a screen 98.

Figure 5:
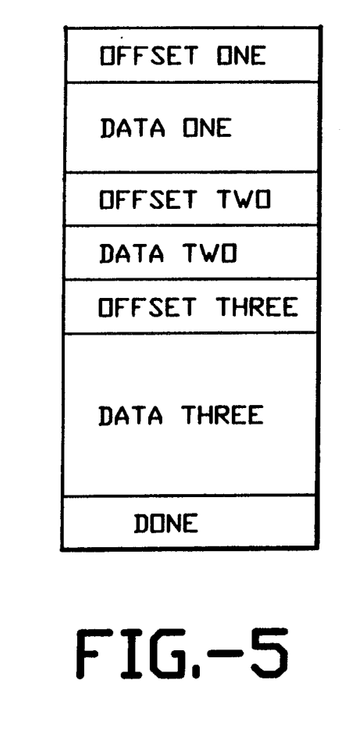
FIG. 5 shows an illustrative pixel data block that can be stored in the sprite information block of the apparatus of FIG. 4.
Figure 6:
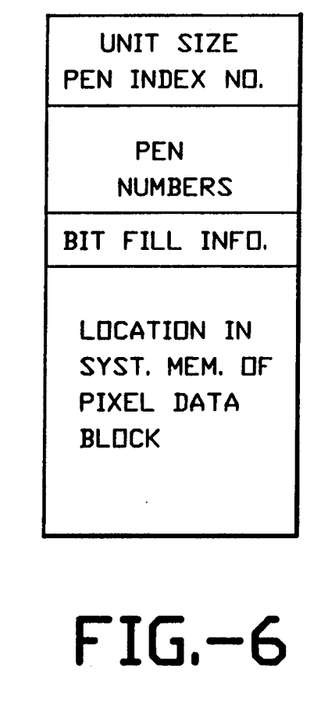
FIG. 6 shows an illustrative control block that can be stored in the sprite information block of FIG. 4.

In the presently preferred embodiment, the sprite information in the sprite information block 44 is stored within respective pixel data blocks and control blocks. The illustrative drawings of FIG. 5 show a representative pixel data block. The illustrative drawings of FIG. 6 show a representative control block. For each sprite, a respective pixel data block stores at least one unit of pen index number information for each pixel of that sprite. For each pixel data block, the units of pen index number include from one to four bits apiece. Each unit of pen index information identifies a pen number of one of the pens in a sixteen pen palette 52. Furthermore, for each such sprite, a respective control block stores information used to control the processing of the information stored in the sprite's pixel data block. As explained below, some sprites can share information stored within a control block.

Indexing circuitry 46 receives on line 48 from one to four bits per unit of pen index number information for each pixel of each sprite. For each such unit, the indexing circuitry provides a corresponding 4-bit pen number of on lines 50. The 4-bit pen numbers provided on lines 50 can be stored in a video buffer block 90 within system memory 42. The video buffer block 90 stores a 4-bit pen number for each respective pixel of the screen 98 used to display an image. In response to a CPU 74, the pen palette 52 accesses, via memory bus 58, the pen numbers stored in the video buffer 90. For substantially each pixel of each sprite, the pen palette 52 provides a respective 12-bit unit of RGB information to RGB display control 55 via lines 56. The RGB display control 55 converts the respective units of RGB information on lines 56 to appropriate voltage and tuning signals on lines 59 as required to produce a desired image on the screen 98.

Referring once again to FIG. 5, the information in the representative pixel data block is formatted in groupings of pixel data. At the beginning of each grouping, an offset identifies the start of the next grouping of pixel data. For example, OFFSET ONE stores a count that represents the number of units of pen index information in the pixel data grouping identified as DATA ONE. OFFSET TWO stores a count that represents the number of units of pen index information in the pixel data grouping identified as DATA TWO. Finally, OFFSET THREE stores a count that represents the number of units of pen index information in the pixel data grouping identified as DATA THREE. The word DONE signifies the end of the pixel data block.

Figure 7:
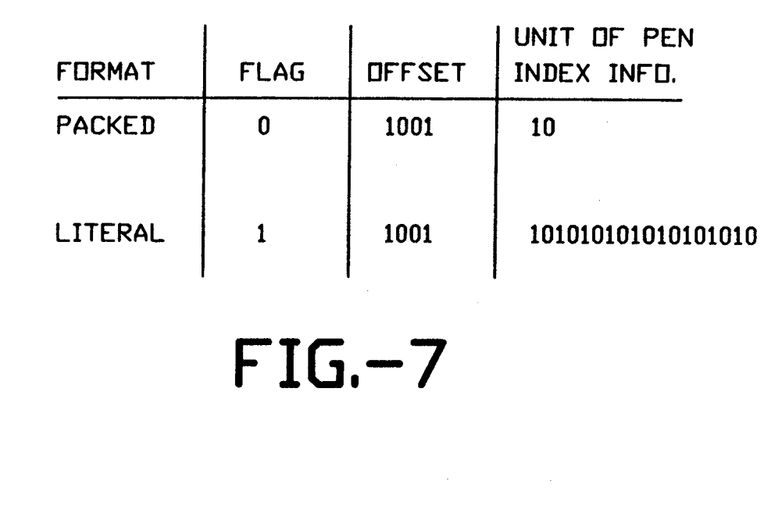
FIG. 7 is an illustrative Format Table that illustrates the storage of pixel data in the pixel data block of FIG. 5 in packed and literal formats.

The illustrative Format Table of FIG. 7 demonstrates that pixel data can be stored in a respective pixel data block in either a literal or a packed format. In the presently preferred embodiment, each grouping of pixel data includes a 1-bit flag followed by a 4-bit offset count which is followed by at least one unit of pen index information. A logical 0 state flag indicates that the pixel data is stored in a packed format, and a logical 1 state flag signifies a literal format. The count represents the number of units of pen index information that share the pen index number that follows the offset count. In a packed format, a unit of pen index number information shared by multiple pixels of a sprite is stored only a single time for all of the multiple pixels. In contrast, in a literal format, a unit of pen index number information shared by multiple pixels of a sprite is separately stored in a pixel data block for each pixel. The Format Table of FIG. 7 shows the same information stored in both packed and literal formats. It will be appreciated that within a given pixel data block, pixel data can be stored in either a packed or a literal format or partially in a packed format and partially in a literal format.

FIG. 6 provides an illustrative drawing of a representative control block. The control block contains information used to control the production of a sprite image using the information stored in a corresponding pixel data block. In particular, the control block for a particular sprite bears information that can be used to draw a correspondence between respective units of pen index number information stored in a corresponding pixel data block and pen numbers of the pen palette 52.

In accordance with the present invention, the number of bits contained in a unit of pen index information can vary from sprite to sprite, and correspondingly, can vary from pixel data block to pixel data block. The number of bits in each unit of pen index information for a sprite ordinarily depends upon the number of pen numbers necessary to identify the pens of the pen palette 52 used to produce the colors that appear in that sprite. As explained more fully below, for sprites that use fewer pen numbers, fewer bits are required per unit of pen index information to distinguish between the necessary pen numbers. It will be appreciated that the storage of fewer bits per unit of pen index information advantageously can reduce the number of bits stored in system memory 42 for a particular sprite.

Furthermore, in accordance with the present invention, the relationship between a particular binary value of a unit of pen index number information and the pen numbers can vary from sprite to sprite. For example, as demonstrated below for one sprite, the 2-bit unit of binary pen index number information 01 may relate to pen number 0001; whereas, for another sprite, the 2-bit unit of binary pen index number information 01 may relate to pen number 1101. For each sprite, indexing information
corresponding to stored in a respective control block the sprite is used to relate units of pen index information in the pixel data block corresponding to the sprite to pen numbers of the pen palette 52.

More specifically, in order to produce a sprite image, the CPU 74 causes an access to information from a respective sprite control block corresponding to that sprite. The accessed control block contains information regarding the location and size of a corresponding pixel data block stored in the sprite control block 44. The CPU 74 uses the information in the accessed control block to locate the corresponding pixel data block and to retrieve information from it for provision on the 8-bit memory bus 58 in successive 4-byte (8 bits per byte) flows. It will be appreciated that, alternatively, a separate CPU (not shown) can be used to control the accessing of control blocks and pixel data blocks.

Each of the 8-bit bytes is successively provided via 8-bit line 60 to a first multiplexer 62. The first multiplexer 62 alternatingly provides four successive 8-bit bytes from the pixel data bock to as first 4-byte input FIFO 64, and then provides four successive 8-bit bytes from the pixel data block to a second 4-byte input FIFO 66. A second multiplexer 68 alternatingly receives successive 8-bit bytes from the first input FIFO 64 and then from the second input FIFO 66.

While the first input FIFO 64 is loading four successive bytes of pixel data, the second input FIFO 66 can provide four successive bytes to a second multiplexer 68. Conversely, while the second input FIFO 66 is loading four successive bytes, the first input FIFO 64 can provide four successive bytes of pixel data to the second multiplexer 68. Thus, although pixel data is retrieved from the sprite information block 44 in 4-byte flows, the respective first and second FIFOs 64 and 66 can operate so as to provide a relatively smooth stream of binary information to the second multiplexer 68.

The second multiplexer 68 provides respective 8-bit bytes of pixel information to 8-bit shift register (SR) and decompacting logic circuitry 70 which converts it into a stream of successive units of pen index information in which each unit corresponds to a respective pixel of a sprite. For example, for a pixel data block in which the unit size for each unit of pen index number information is two bits, the circuitry produces a stream of 2-bit pen index numbers. The control block stores unit size information for its corresponding pixel data block. The CPU 74 accesses the control block in order to retrieve the unit size information for provision to circuitry 70 via the memory bus 58 and lines 72. The circuitry 70 uses the flags and the offset counts stored in the pixel data block to ascertain the format of the data stored in the block.

Thus, the circuitry 70, in response to the flag and offset information stored in the pixel data blocks and the unit size information stored in the control block, converts the information stored in a respective pixel data block into a sequence of units of pen index number information. Referring to FIG. 7, for the case in which a grouping of pixel data stores ten units of pen index information in a packed format and the unit size is two and each unit is the 2-bit binary number 10, the information provided to the circuitry 70 by the second multiplexer 68 is shown on the top line of the illustrative Format Table. On the other hand, for the case in which a grouping of the pixel data block stores ten units of pen index information in a literal format and the unit size is two and each unit is the 2-bit binary number 10, then the information provided to the circuitry 70 by the second multiplexer 68 is shown on the lower line of the Format Table. In either case, the SR and decompact logic circuitry 70 produces on lines 48 a sequence of ten 2-bit long units of pen index information, each unit consisting of the 2-bit binary number 10. In an alternative pixel data block, for example, in which the unit size of the pen index numbers is 3-bits instead of 2-bits, the circuitry 70 would provide on lines 48 a sequence of respective 3-bit units of pen index information.

The indexing circuitry 46 relates each unit of pen index information to a respective pen number. It receives a sequence of units of pen index number information on lines 48, and, for each respective unit, provides a related 4-bit pen index number on lines 50. The indexing circuitry 46 includes a bit filler 76 and a pen index palette 78. In the presently preferred embodiment, the pen index palette 78 includes a register array which includes sixteen 4-bit storage locations, each addressable by a different 4-bit address. In the presently preferred embodiment, for each respective sprite, a control block stores indexing information that specifies the contents of the storage locations of the pen index palette 78. Some sprites, for example, can share the indexing information in a control block. Other sprites, for example, have their own exclusive indexing information stored in their own corresponding control blocks.

In operation, for each sprite, the CPU 74 accesses the indexing information in a control block stored in the sprite information block 44. The indexing information in the accessed control block includes each of the 4-bit pen numbers stored in a prescribed sequence of locations in the block 44. The CPU 74 causes the stored pen numbers to be provided on the memory bus 58 in a prescribed sequence determined by their storage in the sprite information block 44 such that they are loaded via lines 80 into prescribed storage locations of the pen index palette 78. Thus, for each sprite, respective indexing information of a control block stored in the sprite information block 44 specifies the storage locations within the pen index palette 78 where the respective sixteen 4-bit pen numbers are to be stored.

For each pixel data block, the indexing information stored in the control block corresponding to that pixel data block includes bit fill information that is retrieved from the sprite storage block 44 under control of the CPU 74. The bit fill information is provided to a bit filler 76 via the memory bus 58 and lines 82. The bit filler 76, in response to the bit fill information, adds to each successive unit of pen index number information provided on lines 48 a sufficient number of bits to produce on lines 84 a sequence of corresponding 4-bit units of bit filled pen index information.

Figure 8:
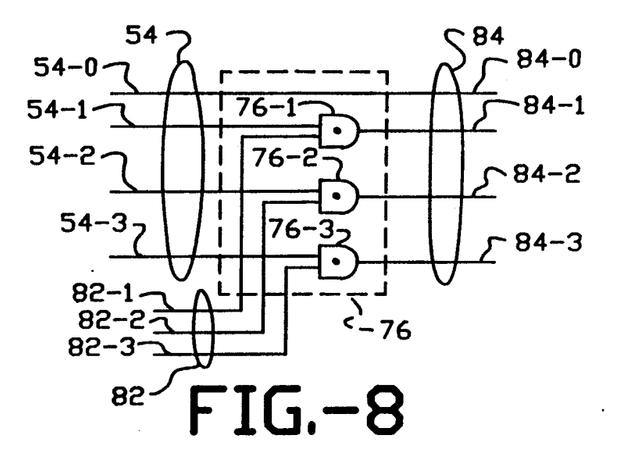
FIG. 8 is a schematic diagram showing details of the bit filler of the apparatus of FIG. 4.

Referring to the illustrative drawing of FIG. 8, there is shown a schematic diagram illustrating details of the bit filler 76. The bit filler 76 includes three AND gates 76-1, 76-2 and 76-3 coupled as shown. The bit filler forces unused bits to a logical 0 state in order to produce respective 4-bit units of bit filled pen index number information on lines 84. For example, where the unit size of the pen index number information for a respective pixel data block is only one bit, the bit fill information received from a corresponding control block on lines 82 comprises logical state 0 signals on each of lines 82-1, 82-2 and 82-3. The result is that one bit units of pen index information provided on line 54-0 appear on line 84-0; whereas, the signals on lines 84-1, 84-2 and 84-3 all are in logical 0 states. Alternatively, for example where the unit size of the pen index number information for a respective pixel data block is three bits, the bit fill information received from a corresponding control block comprises a logical 0 signal only on line 82-3. The result is that three bit units of pen index information provided on lines 54-0, 54-1 and 54-2 appear on lines 84-0, 84-1 and 84-2, and a logical state 0 appears on line 54-3. Thus, the bit filler 76 converts a sequence of units of pen index information, which can vary in size from one to four bits, into a sequence of 4-bit units of bit filled pen index information.

Figure 9A:
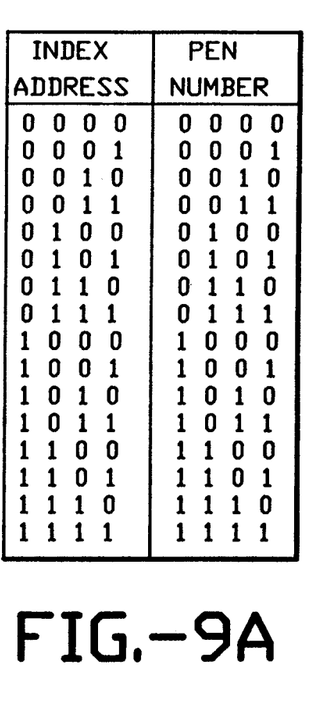
FIGS. 9A and 9B illustrate the storage of a plurality of 4-bit pen numbers in two different sets of prescribed storage locations within the pen index palette of the apparatus of FIG. 4.
Figure 9B:
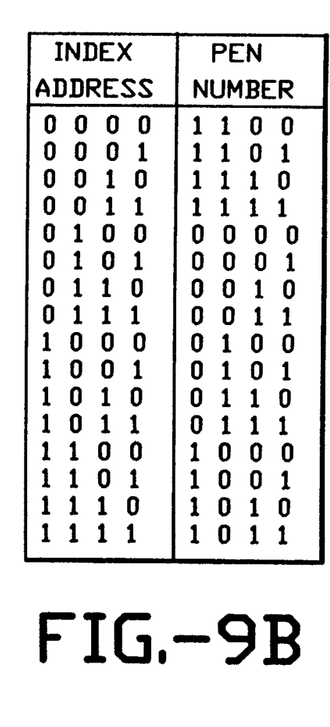

The sequence of units of bit filled pen index information serves as a sequence of 4-bit addresses which address respective storage locations of the pen index palette 78. The illustrative drawings of FIGS. 9A and 9B illustrate the storage locations of the pen index palette 78 and the corresponding 4-bit units of bit filled pen index information that address those locations. In both FIGS. 9A and 9B, the pen index palette 78 is filled with sixteen different 4-bit pen numbers. However, in FIG. 9A the respective pen numbers are stored in one prescribed set of storage locations, and in FIG. 9B, the respective pen numbers are stored in another prescribed set of storage locations.

As explained above, for each sprite the location within the pen index palette 78 where 4-bit pen numbers are stored is determined by the indexing information in a control block. Thus, for different sprites, although the same 4-bit units of bit filled pen index information always address the same storage locations of the pen index palette 78, those locations may contain different pen numbers.

For example, when the pen index palette 78 is loaded as illustrated in FIG. 9A, the provision of a 4-bit unit of bit filled pen index information 0010 on lines 84 addresses the storage location in the pen index palette 78 containing 4-bit binary pen number 0010. Furthermore, the provision of the 4-bit unit of bit filled pen index information 0100 on lines 84 addresses the storage location containing the 4-bit binary pen number 0100.

In contrast, when the pen index palette 78 is loaded as illustrated in FIG. 9B, the provision on lines 84 of the 4-bit unit of bit filled pen index information 0010 addresses the same memory location of the pen index palette 78 that was addressed by those same bits for the previous sprite. However, this time the 4-bit pen number 1110 is stored in that location. Similarly, the provision on lines 84 of the 4-bit unit of bit filled pen index information 0100 addresses the same memory address location of the pen index palette 78 that was addressed by those same bits for the previous sprite. However, once again a different 4-bit pen number is stored in that storage location. This time the 4-bit pen number 0000 is stored there.

In response to the receipt of a unit of bit filled pen index information on lines 84, the pen index palette 78 produces on lines 50 the 4-bit pen number stored in the storage location addressed by the received unit. Thus, for example, when the pen index palette 78 is loaded in accordance with the drawing of FIG. 9B, the provision of 1110 on lines 84 results in the provision of 1010 on lines 50.

As mentioned above, it will be appreciated that, for example, in the case of a pen index palette 78 loaded as shown in FIG. 9A, where the unit size of the units of pen index information is two, a 2-bit unit of pen index information in the form 01 is converted by the bit filler 76 to 0001, which in turn, identifies pen number 0001. In contrast, for example, in the case where the pen index palette 78 is loaded as shown in FIG. 9B and the unit size is two, a 2-bit unit of pen index information in the form 01 is similarly converted by the bit filler 76 to 0001, but this time, it identifies pen number 1101.

Figure 10:
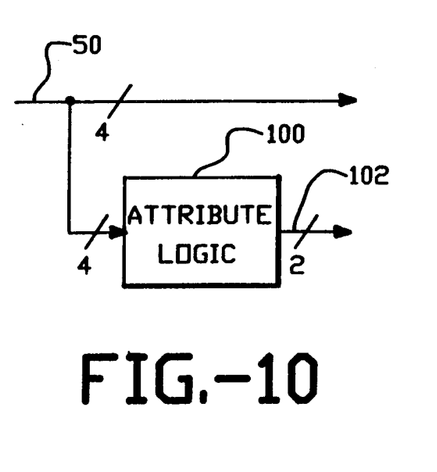
FIG. 10 is a block diagram showing details of the output FIFO attribute logic of the apparatus of FIG. 4.

The output FIFO and attribute logic 86 receives the sequence of 4-bit pen numbers provided on lines 50 by the indexing circuitry 46. In a manner which will be understood by those skilled in the art, it generates two units of attribute information for each such 4-bit pen number. As illustrated in the exemplary drawings of FIG. 10, the attribute logic 100 produces on lines 102 two bits of attribute information for each 4-bit pen number on lines 50. In the presently preferred embodiment, those two bits indicate for each pen number whether the pen number possesses the attribute of collidability, non-collidability, transparency or non-transparency. It will be appreciated that two bits of attribute information per pen number are sufficient to distinguish between these four attributes. Since each respective pen number that appears on lines 50 corresponds to a respective pixel of a respective sprite, the output FIFO 86, in essence, produces two bits of attribute information for each respective pixel of each respective sprite.

The output FIFO and attribute logic 86 combines two successive 4-bit pen numbers and their corresponding two bits apiece of attribute information into a respective 12-bit unit of information which is provided to data merge logic 88. The data merge logic 88, which forms no part of the present invention, controls the updating of the video buffer block 90 and the collision buffer block 92 of system memory 42. For each respective 12-bit unit of information provided by the output FIFO 86, the data merge logic 88 determines whether or not the digital information stored in the respective video buffer block 90 and the collision buffer block 92 should be modified. The data merge logic 88 provides control signals on lines 94 which cause either a Read, a Write or a Read-Modify-Write (RMW) of digital information in the respective video and collision buffers 90 and 92. In the preferred embodiment, the data merge logic 88 operates in two phases. During one phase, eight bits of digital information from the video buffer block 90 can be accessed via lines 96 for the purpose of a Read, Write or RMW. During the other phase, eight bits of digital information similarly can be accessed from the collision buffer block 92 for the purpose of a Read, Write or RMW. It will be appreciated that for each 12-bit unit of information, the 4-bits of attribute information determine whether or not the corresponding 8-bits of pen number information are to be used to change eight bits within one or both or neither of the video and collision buffers 90 and 92. The use of the attribute information, however, forms no part of the present invention, and will be understood by those skilled in the art. Thus, the use of the attribute information need not be described herein.

When an entire pixel data block for a given sprite has been accessed, and its contents have been converted into a sequence of pen numbers, the CPU 74 can access another control block. The information of another pixel data block then can be similarly converted into pen numbers. Each control block stores a pointer to the next control block to be accessed.

The video buffer block 90 stores at least one respective 4-bit pen number for each pixel of each sprite that appears in an image on the screen 98. The CPU 74 successively accesses each pen number stored in the video buffer 90 and causes the pen palette 52 to receive these pen numbers via the memory bus 58 and lines 54. The pen palette 52, in response to the pen numbers, produces on lines 50 a respective 12-bit unit of RGB information for each respective pixel of the image on the screen 98.

The collision buffer block 92 stores at least one respective 4-bit collision number for each pixel of each sprite that appears in an image on the screen 98. A collision processor (not shown) can use this information to determine whether or not sprites shown in an image should actually appear to collide.

Thus, the apparatus and method of the present invention advantageously permits the storage of fewer bits of sprite information in the course of the production of multicolor visual images including dynamically interactive sprites. In particular, for each sprite, the indexing information stored in the sprite control block for that sprite relates units of pen index information stored in the pixel data block for that sprite to individual pen numbers. As a consequence, the unit size of the units of pen index information often can be smaller, resulting in fewer bits of pixel data stored per sprite.

Furthermore, the colors emanating from individual pixels of one sprite in a visual image advantageously can be changed without affecting identical colors appearing in other sprites of the same image by merely changing the indexing information in the control block of the sprite to be changed. For example, changing the storage locations of pen numbers in the pen index palette 78 can result in a change in the colors emanating from certain pixels in one sprite without affecting the appearance of other sprites. One skilled in the art will appreciate that such changes can be achieved dynamically through software.

While particular a embodiment and method has been disclosed herein, it will be appreciated that changes to this embodiment and method can be made without departing from the invention. Thus, the foregoing description is not intended to limit the invention which is defined by the appended claims in which:

It is claimed:

1. Apparatus for synchronously providing color information for multiple display objects to a multicolor raster display, the apparatus comprising:

display object selection means for serially selecting display objects;

pixel graphics storage means for storing pixel graphics data on an object-by-object basis and for serially providing pixel graphics data for each pixel of a selected display object;

index array storage means for storing index arrays of pen numbers on an object-by-object basis and for providing an index array of pen numbers in response to the selection of a corresponding display object;

index palette means coupled to the index array storage means for receiving an index array of pen numbers, and coupled to the pixel graphics storage means for serially receiving graphics data, the index pallet means for addressing the received index array of pen numbers in response to the graphics data on a pixel-by-pixel basis and for providing addressed pen numbers; and pen palette means coupled to receive pen numbers from the index palette means and including a number of dynamically alterable storage locations for storing color information, the pen palette means for synchronously providing color information to the multicolor raster display from a storage location selected in response to received pen numbers.

2. Apparatus as in claim 1 further comprising a buffer coupled to receive addressed pen numbers from the index palette means, for storing the pen numbers into locations corresponding to display locations on the multicolor raster display, and for providing the pen numbers to the pen palette means in synchronization with the a raster display.

3. Apparatus as in claim 2 wherein the buffer comprises a bit-map with a location corresponding to each pixel location of the multicolor raster display.

4. Apparatus as in 3 wherein the index array storage means further stores bit-depth information for each display object, the bit-depth information indicating a number of bits stored in the pixel graphics storage means for each pixel, the pixel graphics storage means providing the number of bits for each pixel in response to the bit-depth information, and the index array provided for each display object comprising a pen number corresponding to each of the possible values for the pixel graphics data.

5. A method for synchronously providing color information for multiple display objects to a multicolor raster display, the method comprising the steps of storing pixel graphics data on an object-by-object basis;

storing index arrays of pen numbers on an object-by-object basis;

serially selecting display objects;

serially providing pixel graphics data for each pixel of a selected display object from the stored pixel graphics data;

selecting an index array of pen numbers from the stored index arrays corresponding to the selected display object;

addressing the selected index array of pen numbers on a pixel-by-pixel basis in response to the provided graphics data to provide addressed pen numbers; and synchronously providing color information to the multicolor raster display from a dynamically alterable storage location selected in response to the addressed pen umbers.

6. A method as in claim 5 wherein the step of addressing the selected index array of pen numbers further includes the step of storing the provided addressed pen numbers into a buffer at locations corresponding to display locations on the multicolor raster display, and providing the addressed pen numbers in synchronization with the a raster display.

* * * * *